United States Patent
Zhou et al.

(10) Patent No.: US 9,822,215 B2
(45) Date of Patent: Nov. 21, 2017

(54) ETHERAMINES WITH ENHANCED THERMAL STABILITY AND THEIR USE AS CURATIVES OR INTERMEDIATES FOR POLYMER SYNTHESIS

(71) Applicant: Huntsman Petrochemical LLC, The Woodlands, TX (US)

(72) Inventors: Hui Zhou, The Woodlands, TX (US); David C Lewis, Conroe, TX (US); Howard P Klein, Austin, TX (US); Terry L Renken, Conroe, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 0 days.

(21) Appl. No.: 15/030,110

(22) PCT Filed: Oct. 17, 2014

(86) PCT No.: PCT/US2014/061035
§ 371 (c)(1),
(2) Date: Apr. 18, 2016

(87) PCT Pub. No.: WO2015/058032
PCT Pub. Date: Apr. 23, 2015

(65) Prior Publication Data
US 2016/0257777 A1    Sep. 8, 2016

Related U.S. Application Data

(60) Provisional application No. 61/892,654, filed on Oct. 18, 2013.

(51) Int. Cl.
| | | |
|---|---|---|
| *C08G 59/50* | (2006.01) | |
| *C08G 65/26* | (2006.01) | |
| *C08G 18/50* | (2006.01) | |
| *C08G 18/32* | (2006.01) | |
| *C08G 18/72* | (2006.01) | |
| *C08G 59/24* | (2006.01) | |
| *C08G 65/322* | (2006.01) | |
| *C08G 65/325* | (2006.01) | |
| *C08G 65/333* | (2006.01) | |
| *C08L 71/02* | (2006.01) | |

(52) U.S. Cl.
CPC ....... *C08G 59/504* (2013.01); *C08G 18/3234* (2013.01); *C08G 18/5024* (2013.01); *C08G 18/72* (2013.01); *C08G 59/245* (2013.01); *C08G 65/26* (2013.01); *C08G 65/2603* (2013.01); *C08G 65/2609* (2013.01); *C08G 65/322* (2013.01); *C08G 65/3255* (2013.01); *C08G 65/33348* (2013.01); *C08L 71/02* (2013.01)

(58) Field of Classification Search
CPC .. C08G 59/5026; C08G 59/504; C08G 65/26; C08G 65/2606; C08G 65/2609; C08G 65/322; C08G 18/3234; C08G 18/5024; C08G 18/72
See application file for complete search history.

(56) References Cited

U.S. PATENT DOCUMENTS

| | | | |
|---|---|---|---|
| 2,683,730 A | 7/1954 | Fauser et al. | |
| 2,950,263 A | 8/1960 | Herbert et al. | |
| 3,012,008 A | 12/1961 | Lister | |
| 3,152,998 A | 10/1964 | Moss | |
| 3,344,162 A | 9/1967 | Rowton | |
| 3,362,979 A | 1/1968 | Bentley | |
| 3,394,164 A | 7/1968 | Kolakowski et al. | |
| 4,014,993 A | 3/1977 | Boettger et al. | |
| 4,152,353 A | 5/1979 | Habermann | |
| 4,588,840 A * | 5/1986 | Gurgiolo | C07C 217/50 564/443 |
| 4,748,192 A | 5/1988 | Smith | |
| 4,766,245 A | 8/1988 | Larkin et al. | |
| 4,769,438 A * | 9/1988 | Zimmerman | C08G 59/184 525/504 |
| 4,786,704 A | 11/1988 | Hughes et al. | |
| 5,912,189 A * | 6/1999 | Wolak | C08G 65/33327 44/329 |
| 9,139,690 B2 | 9/2015 | Schmidt | |
| 2012/0259075 A1 | 10/2012 | Klein et al. | |
| 2012/0283405 A1 * | 11/2012 | Klein | C09D 5/24 528/68 |

FOREIGN PATENT DOCUMENTS

| | | | |
|---|---|---|---|
| JP | 2008101068 A | 5/2008 | |
| WO | 2012/149340 A | 11/2012 | |

* cited by examiner

Primary Examiner — Michael L Leonard
(74) Attorney, Agent, or Firm — Huntsman Petrochemical LLC; Lewis Craft

(57) ABSTRACT

Implementations described herein relate to an etheramine mixture containing a cyclobutane based amine and its method of production by alkoxylating an initiator with an alkylene oxide to produce a precursor polyol and reductively aminating the precursor polyol to form the ehteramine mixture. The etheramine mixture may be used in a variety of applications including as a curing agent for an epoxy resin or as a reactant in the production of polyurea materials.

17 Claims, No Drawings

ETHERAMINES WITH ENHANCED THERMAL STABILITY AND THEIR USE AS CURATIVES OR INTERMEDIATES FOR POLYMER SYNTHESIS

CROSS-REFERENCE TO RELATED APPLICATIONS

This application is the National Phase of International Application PCT/US2014/061035 filed Oct. 17, 2014 which designated the U.S. and which claims priority to U.S. App. Ser. No. 61/892,654 filed Oct. 18, 2013. The noted applications are incorporated herein by reference.

BACKGROUND

Field

Implementations described herein generally relate to an etheramine mixture containing a cyclobutane based amine, methods for its production, and its use as a curing agent or as a raw material in the synthesis of polymers.

Description of the Related Art

Manufacturing processes commonly used in conjunction with the production of epoxies include filament winding, pultrusion, infusion molding, resin transfer molding (RTM), vacuum assisted RTM (VARTM) and wet lay-up or vacuum bag techniques. Polyoxyalkylene amines, or "polyetheramines" as they are sometimes called, are useful as curing agents in epoxy systems to improve flexibility, and to lengthen working time in the manufacture of fiber-reinforced composites. The "working time" is defined as the time period between when the reactive components of the epoxy resin are first mixed with one another and when the mixture is no longer suitable for processing. During the working time, the resin or article containing the resin remains in a pourable, flexible, pliable or otherwise moldable form.

The use of epoxy binders is preferred by many manufacturers of fiber-reinforced composite wind turbine generator ("WTG") propellers. These WTG propellers each typically comprise three individual epoxy-composite blades having lengths from 20-60 meters each. Unfortunately, the working times provided for by currently-available amine curing agents are insufficient for the preparation of larger blades, having lengths up to 100 meters, having optimal properties. In addition to a longer working time, the materials from which a larger WTG blade is made must also maintain good mechanical and thermal properties when cured.

Many WTG blade manufacturers today use the VARTM process when working with liquid epoxy systems or epoxy polyester systems. These resin systems must cure slowly in a controlled fashion and allow sufficient working time to wet-out the fiberglass, aramid fiber, carbon fiber, or other fibers that are used as reinforcing materials in the wind turbine blades. In some cases, prepreg epoxy systems may be used. In these instances, fibers pre-impregnated with a reasonably latent epoxy resin system may be used to form the turbine blade. The use of polyetheramines as epoxy curing agents is not common in the prepreg materials, but is common practice by some using VARTM and other liquid molding processes, where JEFFAMINE® D-230 amine (Huntsman Corporation, Houston, Tex.) is used in large quantities. However, manufacturers understand that the working time for using such materials may not be long enough for optimum production and also, mechanical and thermal performance may not be good enough, mainly when manufacturing larger sized blades. Since the tendency in the VVTG industry is to go to longer blade length to increase the ability of each WTG to produce more power/unit, a need has arisen in the art for curing agents which can make the manufacture of such blades commercially viable.

SUMMARY

Implementations described herein generally relate to an etheramine mixture containing a cyclobutane based amine, methods for its production, and its use as a curing agent or as a raw material in the synthesis of polymers. In one implementation, an etheramine mixture is provided. The etheramine mixture comprises a cyclobutane based amine of formula (I):

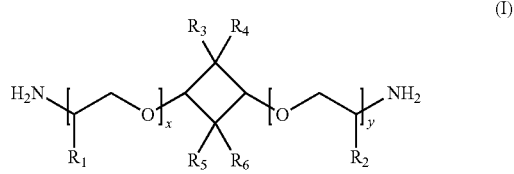

In formula (I), $R_1$, $R_2$, $R_3$, $R_4$, $R_5$ and $R_6$ are identical or different and are each, independently of one another, hydrogen, a linear or branched $C_1$ to $C_5$ alkyl group, a linear or branched $C_2$-$C_5$ alkenyl group, or a substituted or unsubstituted $C_6$-$C_{12}$ aryl group. $R_1$, $R_2$, $R_3$, $R_4$, $R_5$ and $R_6$ may be independently selected from hydrogen, $CH_3$ and $C_2H_5$. $R_3$, $R_4$, $R_5$ and $R_6$ may each be $CH_3$. x and y may each individually be a number from zero to six, for example, zero, one, two, three, four, five or six. The sum of x+y may be a number from zero to twelve, for example, one, two, three, four, five, six, seven, eight, nine, ten, eleven or twelve. In one example, the sum of x+y may be one. In another example, the sum of x+y may be zero. The etheramine mixture may contain at least about 10% by weight, based on the total weight of the etheramine mixture, of the etheramine of formula (I) wherein x+y equals one. The etheramine mixture may contain from about 30% by weight to about 50% by weight, based on the total weight of the etheramine mixture, of the etheramine of formula (I) wherein x+y equals one.

In another implementation, a process for preparing an etheramine mixture is provided. The process includes (i) charging an initiator to an alkoxylation reaction zone, (ii) contacting the initiator with an alkylene oxide in the alkoxylation reaction zone to provide a precursor polyol and (iii) charging the precursor polyol to a reductive animation zone and reductively aminating the precursor polyol in the presence of a reductive amination catalyst, hydrogen and ammonia to form the etheramine mixture, wherein the etheramine mixture contains the cyclobutane based amine of formula (I). The initiator may be a cyclobutanediol or a cyclobutanedione. The initiator may be selected from 2,2,4,4-tetramethyl-1,3-cyclobutanedione and 2,2,4,4-tetramethyl-1,3-cyclobutanediol.

In yet another implementation, a process for producing a cured epoxy resin system is provided. The process comprises (i) providing an etheramine mixture of formula (I), (ii) providing an epoxy resin, (iii) contacting the etheramine mixture and the epoxy resin to form an epoxy resin system; and (iv) curing the epoxy resin system.

In yet another implementation, a process for producing a polyurea is provided. The process comprises reacting the etheramine mixture of formula (I) with an organic polyisocyanate.

Implementations described herein further relate to an etheramine mixture containing a cyclobutane based amine, methods for its production, and its use as a curing agent or as a raw material in the synthesis of polymers. In one implementation, an etheramine mixture is provided. The etheramine mixture comprises a cyclobutane based amine of formula (II):

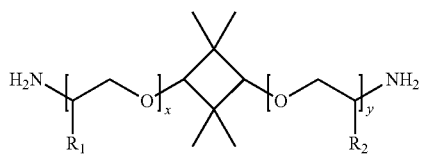

(II)

In formula (II), $R_1$ and $R_2$ are identical or different and are each, independently of one another, hydrogen, a linear or branched $C_1$ to $C_5$ alkyl group, a linear or branched $C_2$-$C_5$ alkenyl group, or a substituted or unsubstituted $C_6$-$C_{12}$ aryl group. $R_1$ and $R_2$ may be independently selected from hydrogen, $CH_3$ and $C_2H_5$. x and y may each individually be a number from zero to six, for example, zero, one, two, three, four, five or six. The sum of x+y may be a number from zero to twelve, for example, one, two, three, four, five, six, seven, eight, nine, ten, eleven or twelve. In one example, the sum of x+y may be one. In another example, the sum of x+y may be zero. The etheramine mixture may contain at least about 10% by weight, based on the total weight of the etheramine mixture, of the etheramine of formula (II) wherein x+y equals one. The etheramine mixture may contain from about 30% by weight to about 50% by weight, based on the total weight of the etheramine mixture, of the etheramine of formula (II) wherein x+y equals one.

In another implementation, a process for preparing an etheramine mixture is provided. The process includes (i) charging an initiator to an alkoxylation reaction zone, (ii) contacting the initiator with an alkylene oxide in the alkoxylation reaction zone to provide a precursor polyol and (iii) charging the precursor polyol to a reductive animation zone and reductively aminating the precursor polyol in the presence of a reductive amination catalyst, hydrogen and ammonia to form the etheramine mixture, wherein the etheramine mixture contains the cyclobutane based amine of formula (I). The initiator may be a cyclobutanediol or a cyclobutanedione. The initiator may be selected from 2,2,4,4-tetramethyl-1,3-cyclobutanedione and 2,2,4,4-tetramethyl-1,3-cyclobutanediol.

In yet another implementation, a process for producing a cured epoxy resin system is provided. The process comprises (i) providing an etheramine mixture of formula (II), (ii) providing an epoxy resin, (iii) contacting the etheramine mixture and the epoxy resin to form an epoxy resin system; and (iv) curing the epoxy resin system.

In yet another implementation, a process for producing a polyurea is provided. The process comprises reacting the etheramine mixture of formula (II) with an organic polyisocyanate.

DETAILED DESCRIPTION

The implementations described herein generally relate to the synthesis of amine-terminated compounds and any etheramine prepared from adducting alkylene oxides (e.g., ethylene oxide (EO), propylene oxide (PO) or butylene oxide (BO)), with cyclobutane containing diols, followed by further reductive amination. The amine-terminated compounds contain rigid cyclic segments and may be used to produce products having improved thermal stability, enhanced glass transition temperature and in some implementations having slower amine reactivity. Such products are useful in, among other things, curing epoxy composite binders, especially those used in the manufacture of wind turbine generator blades. The implementations described herein further provide several processing approaches to prepare the above material compositions.

Some implementations described herein include the synthesis of new compositions of matter, which are etheramines having significant quantities of oligomers with only limited amounts of oxygen atoms in the oligomer backbone. Some implementations described herein further provide enhanced thermal stability and retardance of amine reactivity which makes possible epoxy systems with greatly improved thermal resistance, as measured by glass transition temperatures ($T_g$), when used to cure epoxy resins and long open time for large size blade applications.

In some implementations, in order to produce such etheramines, alkylene oxides are adducted to a cylcobutane containing initiator to form alkoxylated precursor polyols. These intermediate polyols are then subjected to reductive amination. The crude reaction products may then be stripped of ammonia and water to provide the final mixture of amine products, which may then be analyzed for amine conversions, water content and oligomer mixture ratios.

Using the implementations described herein, high yields of diamines having low color and viscosity, containing rigid and hindered structure in molecules may be produced. Suitable cyclobutane-containing initiators include cyclobutanediols and cyclobutanediones. Exemplary cyclobutanediols and cyclubutanediones include 2,2,4,4-Tetramethyl-1,3-cyclobutanediol and 2,2,4,4-Tetramethyl-1,3-cyclobutanedione.

These mixtures of cyclobutane based diamines or polyfunctional amines described herein may be used as intermediates in a number of polymer-forming applications. These mixtures may also find use as components of epoxy curatives to provide high thermal stability to structural composites or molded materials. These mixtures may also be useful in adhesives and coatings for various industrial materials. Some of these products may be used to prepare polyurea and thermoplastic polyamide materials.

Some implementations described herein generally relate to an etheramine mixture containing a cyclobutane based amine of formula (I):

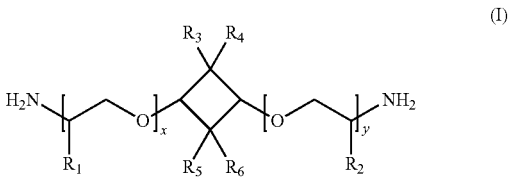

(I)

In formula (I), $R_1$, $R_2$, $R_3$, $R_4$, $R_5$ and $R_6$ are identical or different and are each, independently of one another, hydrogen, a linear or branched $C_1$ to $C_5$ alkyl group, a linear or branched $C_2$-$C_5$ alkenyl group, or a substituted or unsubstituted $C_6$-$C_{12}$ aryl group. $R_1$, $R_2$, $R_3$, $R_4$, $R_5$ and $R_6$ may be independently selected from hydrogen, $CH_3$ and $C_2H_5$. $R_3$, $R_4$, $R_5$ and $R_6$ may each be $CH_3$. x and y may each individually be a number from zero to six, for example, zero, one, two, three, four, five or six. The sum of x+y may be a number from zero to twelve, for example, one, two, three, four, five, six, seven, eight, nine, ten, eleven or twelve. In one example, the sum of x+y may be one. In another example, the sum of x+y may be zero. The etheramine mixture may contain at least about 10% by weight, based on the total weight of the etheramine mixture, of the etheramine of formula (I) wherein x+y equals one. The etheramine mixture may contain from about 30% by weight to about 50% by weight, based on the total weight of the etheramine mixture, of the etheramine of formula (I) wherein x+y equals one.

Some implementations described herein generally relate to an etheramine mixture containing a cyclobutane based amine of formula (II):

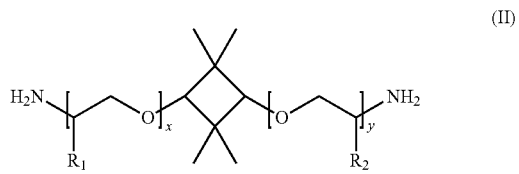

(II)

In formula (II) $R_1$ and $R_2$ may be identical or different and may each be, independently of one another, hydrogen, a linear or branched $C_1$ to $C_6$ alkyl group, a linear or branched $C_2$-$C_6$ alkenyl group, or a substituted or unsubstituted $C_6$-$C_{12}$ aryl group, such as $CH_3$, $C_2H_5$ or $C_6H_5$. x and y may each individually be a number from zero to six, for example, zero, one, two, three, four, five or six. The sum of x+y may be a number from zero to twelve, for example, one, two, three, four, five, six, seven, eight, nine, ten, eleven or twelve. In one example, the sum of x+y may be one. In another example, the sum of x+y may be zero.

In still yet another implementation, the present disclosure generally provides a process for producing a polyurea material by reacting the etheramine mixture described herein with an organic polyisocyanate.

According to one implementation, the etheramine mixture contains at least 10% by weight, based on the total weight of the etheramine mixture, of the cyclobutane based monoetheramine of formula (III):

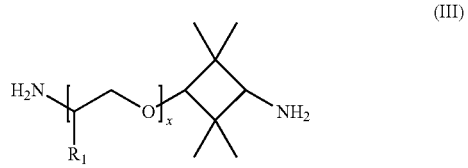

(III)

In the monoetheramine of formula (III), $R_1$ may be hydrogen, a linear or branched $C_1$ to $C_6$ alkyl group, a linear or branched $C_2$-$C_6$ alkenyl group, or a substituted or unsubstituted $C_6$-$C_{12}$ aryl group, such as $CH_3$, $C_2H_5$ or $C_6H_5$. x may be a number from one to six, for example, one, two, three, four, five or six.

According to some implementations, the etheramine mixture contains at least about 10% by weight, at least about 20% by weight, preferably at least about 30% by weight, and more preferably at least about 40% by weight of the monoetheramine of formula (III), based on the total weight of the etheramine mixture. In other implementations, the etheramine mixture contains from about 10% by weight to about 70% by weight, preferably from about 20% by weight to about 60% by weight, and more preferably from about 30% by weight to about 50% by weight of the monoetheramine of formula (III), based on the total weight of the etheramine mixture. In some implementations, the etheramine mixture may further include the cyclobutane based amines of at least one of formula (I) or formula (II).

In another implementation, a process for preparing an etheramine mixture is provided. The process includes (i) charging a cyclobutane-containing initiator to an alkoxylation reaction zone, (ii) contacting the cyclobutane-containing initiator with an alkylene oxide in the alkoxylation reaction zone to provide a precursor polyol and (iii) charging the precursor polyol to a reductive animation zone and reductively aminating the precursor polyol in the presence of a reductive amination catalyst, hydrogen and ammonia to form the etheramine mixture, After charging, the cyclobutane-containing initiator is then contacted with an alkylene oxide in the alkoxylation reaction zone for a period of time sufficient to provide an alkoxylated precursor polyol. The alkylene oxide may be an alkylene oxide having the formula (IV):

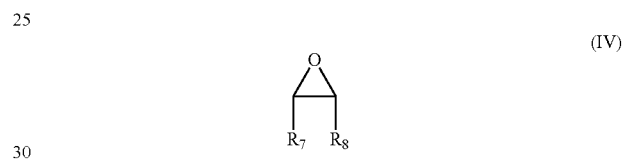

(IV)

In formula (IV), $R_7$ and $R_8$ may be identical or different and may each be, independently of one another, hydrogen, a linear or branched $C_1$-$C_6$ alkyl group, a linear or branched $C_2$-$C_5$ alkenyl group, or a substituted or unsubstituted $C_6$-$C_{12}$ aryl group, such as $CH_3$ and $C_2H_5$. In some implementations, $R_7$ is H, and $R_8$ is one of $CH_3$ and $C_2H_5$. Preferably, the alkylene oxide is ethylene oxide, propylene oxide, butylene oxide (such as isobutylene oxide, 1,2-butylene oxide, and 2,3-butylene oxide), pentylene oxide, styrene oxide or a combination thereof. The amount of alkylene oxide which is contacted with the initiator may range from about 0 to 5 moles, preferably from about 0.5 to 2 moles of alkylene oxide per mole of cyclobutanediol based initiator. The period of time the initiator is contacted with the alkylene oxide is a period of time sufficient to form the precursor polyol and in some implementations may range from about 0.5 hours to about 24 hours.

In one implementation, the alkoxylation reaction zone is a closed reaction vessel, and alkoxylation is carried out under elevated temperature and pressure and in the presence of a base catalyst. Thus, alkoxylation may be conducted at a temperature ranging from about 50° C. to about 150° C. and a pressure ranging from about 40 psi to about 100 psi. The base catalyst may be any alkaline compound customarily used for base-catalyzed reactions, for example, an alkali metal hydroxide such as sodium hydroxide, lithium hydroxide, potassium hydroxide, or cesium hydroxide, or a tertiary amine, such as dimethyl cyclohexylamine or 1,1,3, 3-tetramethylguanidine. After alkoxylation, the resulting mixture may be vacuum stripped to remove any unnecessary components, such as excess unreacted alkylene oxides, water and/or base catalyst, while leaving the resulting precursor polyol.

The precursor polyol may then be used as a feedstock for the reductive animation step. Because the addition during alkoxylation is random, the precursor polyol formed in the alkoxylation reaction zone will not be a pure compound, but rather will be a mixture of unreacted initiator, monoether diol, and polyether diol. The proportion of these diols can be varied considerably and driven to formation of monoether polyol by adjustment of the ratio of the alkylene oxide to the initiator in the alkoxylation reaction zone. Accordingly, in some implementations, the precursor polyol will contain at least 10% by weight, preferably at least 20% by weight, more preferably at least about 30% by weight, and even more preferably at least about 40% by weight of a monoether polyol, based on the total weight of the precursor polyol. In some implementations, the precursor polyol will contain from about 10% by weight to about 70% by weight, preferably from about 20% by weight to about 60% by weight, and more preferably from about 30% by weight to about 50% by weight of a monoether polyol, based on the total weight of the precursor polyol.

In some implementations, prior to reductive amination, the precursor polyol may be neutralized with any suitable acid or chemical adsorbent, such as for example, oxalic acid or magnesium silicate, and filtered for the removal of insoluble materials and metal ions such as $Na^+$, $K^+$ and $Li^+$ etc. The precursor polyol is then charged to a reductive amination zone where it is brought into contact with a reductive amination catalyst, sometimes referred to as a hydrogenation-dehydrogenation catalyst, and reductively aminated in the presence of ammonia and hydrogen under reductive amination conditions. Reductive amination conditions may include, for example, a temperature within the range of about 100° C. to about 240° C. and a pressure within the range of about 500 to about 5,000 psi. In another example, the reductive amination conditions may include temperatures within the range of about 180° C. to about 220° C. and pressures within the range of about 1,000 to about 2,500 psi.

Any suitable hydrogenation catalyst may be used, such as those described in U.S. Pat. No. 3,654,370, the contents of which are incorporated herein by reference. In some implementations, the hydrogenation catalyst may comprise one or more of the metals of group VIIIB of the Periodic Table, such as iron, cobalt, nickel, ruthenium, rhodium, palladium, and platinum, mixed with one or more metals of group VIB of the Periodic Table such as chromium, molybdenum or tungsten. A promoter from group IB of the Periodic Table, such as copper, may also be included. As an example, a catalyst may be used comprising from about 60 mole percent to about 85 mole percent of nickel, about 14 mole percent to about 37 mole percent of copper and about 1 mole percent to about 5 mole percent of chromium (as chromia), such as a catalyst of the type disclosed in U.S. Pat. No. 3,152,998. As another example, a catalyst of the type disclosed in U.S. Pat. No. 4,014,933 may be used containing from about 70% by weight to about 95% by weight of a mixture of cobalt and nickel and from about 5% by weight to about 30% by weight of iron. As another example, a catalyst of the type disclosed in U.S. Pat. No. 4,152,353 may be used, comprising nickel, copper and a third component which may be iron, zinc, zirconium or a mixture thereof, for example, a catalyst containing from about 20% by weight to about 49% by weight of nickel, about 36% by weight to about 79% by weight of copper and about 1% by weight to about 15% by weight of iron, zinc, zirconium or a mixture thereof. As still another example, a catalyst of the type described in U.S. Pat. No. 4,766,245 may be used comprising about 60% by weight to about 75% by weight of nickel and about 25% by weight to about 40% by weight of aluminum.

The reductive amination is preferably conducted on a continuous basis with the precursor diol, ammonia, and hydrogen being continuously charged to a reactor containing a fixed bed of reductive amination catalyst and with the reaction product being continually withdrawn.

The reaction product is suitably depressured so as to recover excess hydrogen and ammonia for recycle and is then fractionated to remove byproduct water of reaction and to provide the desired etheramine mixture.

In conducting the reductive amination, the reductive amination conditions to be utilized may suitably include the use of from about 4 moles to about 150 moles of ammonia per hydroxyl equivalent of precursor diol feedstock. Hydrogen is preferably used in an amount ranging from about 0.5 mole equivalents to about 10 mole equivalents of hydrogen per hydroxyl equivalent of precursor diol feedstock. The contact times within the reaction zone, when the reaction is conducted on a batch basis, may suitably be within the range of from about 0.1 hours to about 6 hours and more preferably from about 0.15 hours to about 2 hours.

When the reaction is conducted on a continuous basis using catalyst pellets, reaction rates may suitably be from about 0.1 grams to about 2 grams of feedstock per hour per cubic centimeter of catalyst and, more preferably, from about 0.3 grams to about 1.6 grams of feedstock per hour per cubic centimeter of catalyst.

Also, the reductive amination may be conducted in the presence of about 1 mole to about 200 moles of ammonia per mole of precursor diol and more preferably, from about 4 moles to about 130 moles of ammonia per mole of precursor diol. From about 0.1 moles to about 50 moles of hydrogen per mole of precursor diol may be employed and, more preferably, from about 1 mole to about 25 moles of hydrogen per mole of precursor diol.

Due to its favorable properties, the etheramine mixture described herein may be used as a constituent in a formulation which finds use in a wide variety of industrial applications, for example for the production of moldings (casting resins), fiber-reinforced composites, such as wind turbine generator blades, for tool manufacture or for the production of coatings and/or intermediate coatings on a wide variety of substrates, for example on substrates of an organic or inorganic nature, such as wood, wood fibers (wood sealing), textiles of natural or synthetic origin, plastics, glass, ceramics, building materials, such as concrete, fiberboard, and artificial stone, on metal, such as iron, aluminum, copper and the like. In addition, the etheramine mixture described herein can be employed as a constituent of adhesives, cement, laminating resin, synthetic resin cement, paint or coating. The formulation can be prepared prior to or during use by contacting the constituents, for example by mixing, and it can also be applied to any type of surface(s), for example, by brushing, spraying, dipping coating, extruding, printing, electrostatic spraying, and the like, and then subsequently cured to form a cured material.

According to one implementation, the etheramine mixture of the present invention containing at least one of formula (I), formula (II) and formula (III) is contacted with an epoxy resin to form an epoxy resin formulation. The epoxy resin formulation may then be subjected to conditions sufficient to cause the epoxy resin formulation to cure.

The epoxy resin may be any one or mixture of reactive epoxy resin(s) having a 1,2-epoxy equivalency (functionality), on the average, of at least 1 epoxide groups per molecule, preferably at least 1.3 epoxide groups per molecule, and more preferably at least 1.6 epoxide groups per molecule, and even more preferably with epoxy resins having a functionality of at least 2 epoxy groups per molecule such that the mixture will polymerize to form a useful material with the amine described herein or its blend with other amine hardeners. In another implementation, the epoxy resin has a functionality on the average ranging from at least 1.3 epoxide groups per molecule to about 8 epoxide groups per molecule, preferably from at least about 1.6 epoxide groups per molecule to about 5 epoxide groups per molecule. The epoxy resin can be saturated or unsaturated, linear or branched, aliphatic, cycloaliphatic, aromatic or heterocyclic, and may bear substituents such as bromine or fluorine. It may be monomeric or polymeric, liquid or solid, but is preferably liquid or a low melting solid at room temperature.

According to one implementation, the epoxy resin is a polyglycidyl epoxy compound, such as a polyglycidyl ether, poly(β-methylglycidyi) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol-1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis(2-hydroxyethyl)aniline or p,p'-bis(2-hydroxyethylamino) diphenylmethane.

Representative examples of polyglycidyl ethers or poly(β-methylglycidyl) ethers include those based on monocyclic phenols, for example, on resorcinol or hydroquinone, on polycyclic phenols, for example, on bis(4-hydroxyphenyl) methane (Bisphenol F), 2,2-bis(4-hydroxyphenyl)propane (Bisphenol A), bis(4-hydroxyphenyl)S (Bisphenol S), alkoxylated Bisphenol A, F or S, triol extended Bisphenol A, F or S and brominated Bisphenols A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(β-methylglycidyl) esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, can be used.

In another implementation, the epoxy resin is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups. Particularly suitable non-glycidyl epoxy compound's include the following difunctional non-glycidyl epoxide compounds in which the epoxide groups form part of an alicyclic or heterocyclic ring system: bis(2,3-epoxycyclopentyl) ether, 1,2-bis(2,3-epoxycyclopentyloxy)ethane, 3,4-epoxycyclohexyl-methyl, 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl)ether, vinylcyclohexene dioxide, dicyclopentadiene diepoxide or 2-(3,4-epoxycyclohexyl-5,5-spiro-3,4-epoxy)cyclohexane-1,3-dioxane, and 2,2'-bis-(3,4-epoxy-cyclohexyl)-propane.

In another implementation, the epoxy resin is an epoxy novolac compound obtained by the reaction of, preferably in the presence of a basic catalyst such as sodium or potassium hydroxide, an epihalohydrin, such as epichlorohydrin, with a resinous condensate of an aldehyde, such as formaldehyde and either a monohydric phenol or polyhydric phenol.

In other implementations, the epoxy resin is a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl) ether.

It is also possible to employ epoxy-containing compounds in which the 1,2-epoxide groups are attached to different heteroatoms or functional groups. Examples of these compounds include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Other epoxide derivatives may be employed, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methylpropoxy)ethane. Also conceivable is the use of oxetanes or liquid pre-reacted adducts of epoxy-containing compounds, such as those mentioned above, with hardeners for the epoxy resins.

The epoxy resin formulation may further contain customary additives and auxiliaries such as stabilizers, modifiers, antifoaming agents, toughening agents, accelerators, co-curing agents, leveling agents, thickening agents, flame retardants, antioxidants, pigments, dyes, fillers and combinations thereof. For example, an accelerator such as guanidine or a derivative thereof may be used in the epoxy resin formulation. Examples of guanidine derivatives include without limitation, an alkylguanidine such as dimethylguanidine or tetramethyl guanidine, or a guanidinium salt derived from any of these. Examples of guanidinium salts include without limitation, guanidine carbonates, guanidine acetates, and guanidine nitrates. One skilled in the art with the benefit of this disclosure will recognize appropriate additives and auxiliaries for use in the implementations described herein.

In some implementations described herein, the etheramine mixtures may not require the use of co-curing agent, such as cycloaliphatic diamines such as isophorone diamine. In these implementations, fewer materials would be needed to manufacture the epoxy resin as well as less energy needed to reach the lower cure temperature.

Once formulated, the epoxy resin formulation may be applied to one or more surfaces, for example, brushing, spraying, dipping, electrostatic spraying, etc., and subjected to conditions suitable to cause the epoxy resin system to cure. In one implementation, the epoxy resin formulation is cured at ambient conditions. In another implementation, the epoxy resin formulation is cured at an elevated temperature such as, at a temperature within the range from about 40° C. to about 220° C. In some implementations of the present disclosure, a lower cure temperature and/or lower cure time may be needed to reach desired cure properties, such as glass transition temperatures, than is typically required in current epoxy resin systems. Achieving improved cure property development at lower curing (such as baking) temperatures and/or shorter curing times means a potential savings in energy costs and a possible reduction in manufacturing process time (increased productivity). In implementations of the present disclosure, the temperature used in curing may be about, or less than, 40° C., 45° C., 50° C., 55° C., 60° C., 65° C., 70° C., 75° C., 80° C., 85° C., 90° C., 95° C. and 100° C. In some implementations of the present disclosure, the cure time may be from about 2 hours (hrs) to about 8 hrs, including the intervals of about 2.5 hrs, 3 hrs, 3.5 hrs, 4 hrs, 4.5 hrs, 5 hrs, 5.5 hrs, 6 hrs, 6.5 hrs, 7 hrs and 7.5 hrs. In one implementation of the present disclosure, the epoxy resin system is cured from about 3 to about 6 hours at about 70 or 80° C. One skilled in the art will recognize, with the benefit of this disclosure, how to reach desired cure properties using lower temperatures and/or lower cure times.

In still another implementation, the etheramine mixture of the present disclosure is reacted with an organic polyisocyanate to form a polyurea. The organic polyisocyanate includes standard isocyanate compounds and compositions known to those skilled in the art. Preferred examples include MDI-based quasi prepolymers such as those commercially available as RUBINATE® 9480, RUBINATE® 9484, and RUBINATE® 9495 brand products which are all available from Huntsman International, LLC. Liquefied MDI such as MONDUR® ML isocyanate, available from Bayer MateriaIScience, may also be used as all or part of the isocyanate.

Other organic polyisocyanates which can be employed include those generally known to one skilled in the art. Thus, for instance, they can include aliphatic isocyanates of the type described in U.S. Pat. No. 4,748,192. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Another example of an aliphatic isocyanate is cyclohexane diisocyanate. Other useful aliphatic isocyanates are described in U.S. Pat. No. 4,705,814 which is fully incorporated herein by reference. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, I-isocyanato-3,3,5-trimethyl-5-isocyanato methylcyclohexane (isophorone diisocyanate); 4,4'-,2,2'- and 2,4'-dicyclohexylmethane diisocyanate as well as the corresponding isomer mixtures, and the like.

A wide variety of aromatic polyisocyanates may also be used to form the polyurea of the present disclosure. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-iso-cyanatophenyl)methane, bis(3-methyl-4-isocyanatophenyl)methane, and 4,4'-diphenylpropane diisocyanate. Other aromatic polyisocyanates which may be used are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979, all of which are fully incorporated herein by reference. Usually, methylene-bridged polyphenyl polyisocyanate mixtures contain about 20 to about 100 weight percent methylene diphenyl diisocyanate isomers, with the remainder being polymethylene polyphenyl diisocyanates having higher functionalities and higher molecular weights. Typical of these are polyphenyl polyisocyanate mixtures containing about 20 to about 100 weight percent diphenyl diisocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979. A preferred aromatic polyisocyanate is methylene bis(4-phenylisocyanate) or "MDI". Pure MDI, quasi-prepolymers of MDI, modified pure MDI, etc. are useful to prepare a polyurea according to the invention. Since pure MDI is a solid and, thus, often inconvenient to use, liquid products based on MDI or methylene bis(4-phenylisocyanate) are used herein. U.S. Pat. No. 3,394,164, incorporated herein by reference, describes a liquid MI product. More generally, uretonimine modified pure MDI is included also. This product is made by heating pure distilled MDI in the presence of a catalyst. The liquid product is a mixture of pure MDI and modified MDI. The term organic polyisocyanate also includes quasi-prepolymers of isocyanates or polyisocyanates with active hydrogen containing materials.

EXAMPLES

The following non-limiting examples are provided to further illustrate implementations described herein. However, the examples are not intended to be all inclusive and are not intended to limit the scope of the embodiments described herein.

Example 1

To a dry, nitrogen purged reactor were added 1544 grams of 2,2,4,4-Tetramethyl-1,3-cyclobutanediol and 10.57 grams of KOH flake. Then, 1698 grams of butylene oxide was slowly added to the reaction mixture while agitating. The reactor was then heated to 130° C. and temperature control was initiated. The reaction mixture was then digested down to constant pressure. Unreacted oxide was stripped out. Then an amount of DI water and magnesium silicate (i.e., Magnesol®) was added to the diol mixture and digested for 2 hours at 120° C. The reaction mixture was then stripped at 50 mm Hg for about one hour to remove any light reactants and water and the filtered product was then collected. The final alkoxylated polyol mixture was a low-color, viscous liquid having a hydroxyl number of ~395 and a water content of 0.03%. The average molecular weight of the final alkoxylated polyol mixture was ~284.

The alkoxylated polyol mixture mentioned above was then reductively aminated with ammonia to prepare the corresponding amines in a 100 cc continuous unit with a fixed-bed nickel based catalyst. The polyol and ammonia were pumped separately, mixed in-line with hydrogen and fed through the catalyst bed. The polyol and ammonia were kept in an approximate 1:1 weight feed ratio, while the ammonia to hydrogen mole ratio was kept at about 10-20:1 weight feed ratio. The reactor pressure was held at 2,000 psig and the temperature was maintained at about 180-220° C. for the entire reductive amination step. The polyol and ammonia feed rates used in each run varied between about 50 g/hr to 100 g/hr. The products were collected and stripped of excess ammonia, water and light amines. A low-color, low-viscosity etheramine mixture was recovered having an amine content of ~6 meq/g and an amine hydrogen equivalent weight of ~83.

Example 2

An epoxy resin formulation containing a bisphenol A/F based epoxy resin having an epoxy equivalent weight of 169 was cured using the etheramine mixture of Example 1 as well as by commercially available curing agents (JEFFAMINE® D-230 amine and XTJ-568 amine). The epoxy resin and amine curing agent were mixed in the amounts listed below in Table 1 to form epoxy system formulations and then cured under the condition listed in Table 1. The glass transition temperature ($T_g$) of the cured material was then measured using a differential scanning calorimeter (DSC) and choosing the temperature at the inflection point of the heat capacity change as the $T_g$. The results are presented below in Table 1:

TABLE I

| | Formulation A | Formulation B | Formulation C |
|---|---|---|---|
| Part A | | | |
| Diluted epoxy resin | 100 pbw | 100 pbw | 100 pbw |
| Part B | | | |
| Example 1 | 49 | | |
| JEFFAMINE ® D-230 amine | | 36 | |
| XTJ-568 amine | | | 35 |
| $T_g$, ° C., after 6 hours at 80° C. | 65 | 70 | 67 |
| $T_g$, ° C., after 6 hours at 80° C. (2nd Scan) | 72 | 74 | 73 |
| $T_g$, ° C., after 3 hours at 80° C., 2 hours at 150° C. | 79 | 74 | 74 |

The $T_g$ obtained for Formulation A which was cured using the etheramine mixture of Example 1 was higher than the $T_g$ obtained for Formulations B and C. After 6 hours at 80° C. curing condition, systems for Formulations B and C have been almost fully cured as indicated from the $T_g$ data, however, for Formulation A, due to the lower reactivity of the etheramine mixture, the system had to be cured at a higher temperature to fully cure. Thus Formulation A has improved working time relative to Formulations B and C and also enhanced glass transition temperature ($T_g$).

While the foregoing is directed to implementations of the present invention, other and further implementations of the invention may be devised without departing from the basic scope thereof, and the scope thereof is determined by the claims that follow.

The invention claimed is:
1. An etheramine mixture comprising:
a cyclobutane based amine of formula (I):

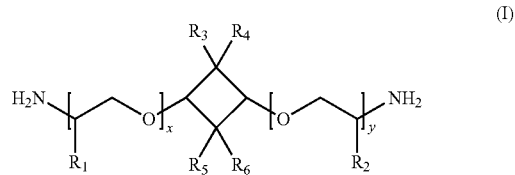

wherein $R_1$, $R_2$, $R_3$, $R_4$, $R_5$ and $R_6$ are identical or different and are each, independently of one another, hydrogen, a linear or branched $C_1$ to $C_5$ alkyl group, a linear or branched $C_2$-$C_5$ alkenyl group, or a substituted or unsubstituted $C_6$-$C_{12}$ aryl group, x and y are each individually a number from 0 to 6 and x+y equals a number from 1 to 12.

2. The etheramine mixture of claim 1, wherein x+y equals one.

3. The etheramine mixture of claim 1, wherein $R_1$ and $R_2$ are independently selected from hydrogen, $CH_3$ and $C_2H_5$.

4. The etheramine mixture of claim 3, wherein $R_3$, $R_4$, $R_5$ and $R_6$ are each $CH_3$.

5. The etheramine mixture according to claim 1, wherein the etheramine mixture contains at least about 10% by weight, based on the total weight of the etheramine mixture, of a monoetheramine of formula (I) wherein x+y equals one.

6. The etheramine mixture according to claim 1, wherein the etheramine mixture contains from about 30% by weight to about 50% by weight, based on the total weight of the etheramine mixture, of a monoetheramine of formula (I) wherein x+y equals one.

7. A process for preparing an etheramine mixture comprising:
(i) charging an initiator to an alkoxylation reaction zone;
(ii) contacting the initiator with an alkylene oxide in the alkoxylation reaction zone to provide a precursor polyol; and
(iii) charging the precursor polyol to a reductive amination zone and reductively aminating the precursor polyol in the presence of a reductive amination catalyst, hydrogen and ammonia to form the etheramine mixture, wherein the etheramine mixture contains a cyclobutane based amine of formula (I):

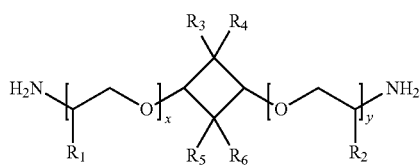

(I)

wherein $R_1$, $R_2$, $R_3$, $R_4$, $R_5$ and $R_6$ are identical or different and are each, independently of one another, hydrogen, a linear or branched $C_1$ to $C_5$ alkyl group, a linear or branched $C_2$-$C_5$ alkenyl group, or a substituted or unsubstituted $C_6$-$C_{12}$ aryl group, x and y are each individually a number from 0 to 6 and x+y equals a number from 1 to 12.

8. The process of claim 7, wherein the initiator is a cyclobutanediol or a cyclobutanedione.

9. The process of claim 8, wherein the initiator is selected from 2,2,4,4-tetramethyl-1,3-cyclobutanedione and/or 2,2,4,4-tetramethyl-1,3-cyclobutanediol.

10. The process of claim 7, wherein the alkylene oxide is propylene oxide.

11. The process of claim 7, wherein the alkylene oxide is butylene oxide.

12. The process of claim 7, wherein the amount of alkylene oxide which is contacted with the initiator ranges from about 0.5 to 2 moles of alkylene oxide per mole of initiator.

13. The process of claim 7, wherein the etheramine mixture contains at least about 10% by weight, based on the total weight of the etheramine mixture, of a monoetheramine of formula (I) wherein x+y equals one.

14. A process for producing a cured epoxy resin system comprising:
(i) providing an etheramine mixture of claim 1;
(ii) providing an epoxy resin;
(iii) contacting the etheramine mixture and the epoxy resin to form an epoxy resin system; and
(iv) curing the epoxy resin system.

15. The process of claim 14, wherein curing the epoxy resin system comprises curing the epoxy resin system from about 3 to about 6 hours at 70 or 80° C.

16. A process for producing a polyurea material comprising reacting the etheramine mixture of claim 1 with an organic polyisocyanate.

17. A polyurea material produced by the process of claim 16.

* * * * *